(12) United States Patent
Chen (10) Patent No.: US 9,145,291 B2
(45) Date of Patent: Sep. 29, 2015

(54) CONTAINER CAPABLE OF LIMITING QUANTITY OF CONTENTS REMOVED THEREFROM AND METHOD FOR REMOVING SAME

(75) Inventor: Zengxin Chen, Beijing (CN)

(73) Assignee: BEIJING RED-SEA TECH CO., LTD., Beijing (CN)

( * ) Notice: Subject to any disclaimer, the term of this patent is extended or adjusted under 35 U.S.C. 154(b) by 178 days.

(21) Appl. No.: 13/819,783

(22) PCT Filed: Sep. 5, 2011

(86) PCT No.: PCT/CN2011/079358
§ 371 (c)(1),
(2), (4) Date: Feb. 28, 2013

(87) PCT Pub. No.: WO2012/028114
PCT Pub. Date: Mar. 8, 2012

(65) Prior Publication Data
US 2013/0153605 A1    Jun. 20, 2013

(30) Foreign Application Priority Data
Sep. 3, 2010    (CN) .......................... 2010 1 0271439

(51) Int. Cl.
*B65D 37/00*    (2006.01)
*B67D 7/30*    (2010.01)
*G01F 11/06*    (2006.01)
(Continued)

(52) U.S. Cl.
CPC ............. *B67D 7/301* (2013.01); *A45D 40/00* (2013.01); *B05B 7/1263* (2013.01); *B05B 9/0816* (2013.01); *B65D 47/20* (2013.01); *G01F 11/023* (2013.01); *G01F 11/04* (2013.01);
(Continued)

(58) Field of Classification Search
CPC ......... G01F 11/04; G01F 11/06; G01F 11/08; G01F 11/023; G01F 11/084; B67D 7/301
USPC ............................... 222/250, 401, 442, 209, 1
See application file for complete search history.

(56) References Cited

U.S. PATENT DOCUMENTS 2,904,227 A * 9/1959 Graham ......................... 222/207
3,491,369 A * 1/1970 Debbrecht ..................... 222/309
(Continued)

FOREIGN PATENT DOCUMENTS

CN        2176330        9/1994
CN        2312205        3/1999
(Continued)

*Primary Examiner* — Daniel R Shearer
(74) *Attorney, Agent, or Firm* — Kirton McConkie; Evan R. Witt (57) ABSTRACT

A container capable of dispensing a quantity of contents less than or equal to a set value. The container includes a main body portion, a pressurizing portion and an outflow channel, wherein the main body portion includes a space for holding the contents and a space for gas, the pressurizing portion increases the gas pressure in the space for gas, and the outflow channel communicates with the space for holding the contents to allow the outflow of the contents; it also includes a moving component in the outflow channel movable with the contents to be taken out, and a gas channel outlet moving with said moving component; on the movement track of the gas channel outlet there is an opening communicating with ambient air and in communication with the gas channel outlet; the other end of the gas channel opens in the space for gas in the main body portion.

14 Claims, 9 Drawing Sheets

(51) Int. Cl.
*G01F 11/04* (2006.01)
*G01F 11/08* (2006.01)
*G01F 11/02* (2006.01)
*A45D 40/00* (2006.01)
*B05B 7/12* (2006.01)
*B65D 47/20* (2006.01)
*B05B 9/08* (2006.01)
*G01F 13/00* (2006.01)

(52) U.S. Cl.
CPC ............. *G01F 11/06* (2013.01); *G01F 11/084* (2013.01); *G01F 13/00* (2013.01); *A45D 2200/054* (2013.01)

(56) References Cited

U.S. PATENT DOCUMENTS 3,853,245 A * 12/1974 Branch et al. ............... 222/144.5
6,343,723 B1 * 2/2002 Hickerson .................... 222/442

FOREIGN PATENT DOCUMENTS

| CN | 2536520 | 2/2003 |
| CN | 2663347 | 12/2004 |
| CN | 201761791 | 3/2011 |
| WO | 02102679 | 12/2002 |

* cited by examiner

CONTAINER CAPABLE OF LIMITING QUANTITY OF CONTENTS REMOVED THEREFROM AND METHOD FOR REMOVING SAME

FIELD OF THE INVENTION

The present invention relates to a container and a removing method for same, and more particularly to a container capable of limiting the quantity of contents removed therefrom and a method for removing same.

BACKGROUND OF THE INVENTION

As living standards improve, scientific awareness of residents is gradually enhanced. Advice provided by scientists on details of daily life such as the amount of oil and soy sauce to be used for the three meals of each day, and the amount of toothpaste used each time receives wide response. However, none of containers commonly used in the life of the residents, such as containers for holding oil, soy sauce, vinegar, and toothpaste, has a function of a limited quantity of removal or a function of a fixed quantity of removal. For each use, the removed quantity is achieved empirically and randomly. Additional removal can deal with insufficient removal, but excess removal only results in excess use. If the actual quantity used is excessive, the advice provided by the scientists fails to be implemented. The quantity of removal is different in each time, so that a result of practical experience, such as a menu, cannot be reproduced.

Two methods are available for removal of a fixed quantity of an oral liquid medicine. One method uses a scale on a container. The other method uses another container having a scale. The first method only achieves the removal of an approximate volume, and extra removal incurs troubles: return may incur pollution to the entire bottle of medicine, and if not returned, the excess quantity cannot be handled. The second method that uses another container having a scale also has the problem of the possible excess quantity, which incurs pollution or waste.

Residents need a simple and practical container capable of limiting the quantity of removal, so that the volume of each removal does not exceed the set quantity.

SUMMARY OF THE INVENTION

The present invention provides a container capable of limiting the quantity of contents removed therefrom, so as to solve the problem of lacking a container, from which a fixed quantity of or a limited quantity of contents can be removed, in the prior art.

The container includes a main body portion, a pressurizing portion, and an outflow channel, the main body portion includes a gas space and a space for holding the contents, the pressurizing portion is a device for increasing a pressure of a gas in the gas space, and the outflow channel is a device that is in communication with the space for holding the contents and allows outflow of the contents.

The container further includes a gas channel and two end outlets thereof, and a moving component, which moves along with outflow of the contents, in the outflow channel. A first end outlet moves along with the moving component. The second end outlet is in the gas space in the main body portion.

An opening is provided on a movement track of the first end outlet of the gas channel, the opening is in communication with an ambient gas, and when the first end outlet moves to the opening, the opening is in communication with the first end outlet.

The container is simple and practical, and enables a limited quantity of or a fixed quantity of the contents to be removed from the container.

Specifically, a thin sheet covering the first end outlet may further be included, and the opening is arranged on the thin sheet.

Further, the first end outlet and the opening are strip-shaped or arranged in a row in turn. The other portions, except a designated portion, of the strip-shaped opening are closed to select an outlet; the other outlets, except a designated outlet, of the openings arranged in turn in a row are closed to select an outlet. By adjusting a distance between the opening and the ambient gas, the limited quantity of the contents for each measured removal is adjusted. A user may select a volume for removal within a preset range for selection.

The moving component and the first end outlet may be integrally arranged or movably connected to each other and arranged in a split manner. When the component moving along with the contents and the opening of the gas channel are an integral device, the moving component and the opening of the gas channel are fixedly connected, and move forwards or backwards together. When the component moving along with the contents and the opening of the gas channel are separate devices, the two are movably connected, and the moving component drives or controls the opening of the gas channel to move.

The moving component may be in close contact with an inner side wall of the outflow channel.

The moving component may be provided with a device for restricting the contents from flowing to one side, close to the main body portion, of the moving component, for example, a one-way valve or other devices.

An inflatable device, such as a film bag or a balloon, may sleeve the opening, in the gas cavity of the main body portion, of the pressurizing portion, so as to prevent a gas added during pressurizing from contacting the liquid. An inflatable device sleeves the opening, in the gas space of the main body portion, of the pressurizing device, and the gas added during pressurizing is all collected in the inflatable device. In this case, if the gas space in the upper part of the main body portion is filled with an inert gas, during a whole removal process of the liquid of the container, the liquid does not contact the ambient gas, and only the inert gas contacts the liquid, which facilitates better protection of the liquid. The second end outlet is arranged in the inflatable device to prevent the inert gas from escaping, so that only the pressurizing gas escapes when in communication with the ambient gas after each pressurizing.

The film bag is not shrinkable, and therefore a part of the gas input into the film bag during each pressurizing remains in the film bag after the pressure decreases, so that during next removal of the contents, the pressure can rise rapidly, thereby avoiding repeated pressurizing during the next time of use, and making the pressure rise rapidly.

A gas pocket for blocking dust may be mounted above the outlet of the outflow channel, and the gas pocket is in communication with the gas space through a gas channel. During pressurizing, the gas pocket inflates, and is straightened horizontally, to open the outlet; after the pressure decreases, a part of the gas pocket above the outlet of the outflow channel sags under the action of gravity to block the opening, which makes the use of the container more convenient.

The moving component may move by friction during movement with the contents, or may move by a pressure transferred during pressurizing performed on the gas space.

When the contents are highly glutinous or viscous, movement may be achieved through the friction during movement along with the contents. The moving component may be arranged on a side wall of the outflow channel, and the contents move to drive the moving component to move. Increase of a contact area of the moving component may achieve a more desirable effect of fixed measured removal. When the movement is achieved through the pressure transferred during pressurizing performed on the gas space, increase of a cross section of the moving component in the outflow channel makes the moving component more sensitive, thereby achieving a more desirable effect of fixing or limiting the quantity.

The pressurizing device is preferably a gasbag having a gas inlet at one end and a gas outlet at the other end and capable of performing pressurizing continuously and repeatedly.

The following measures may turn the limited quantity of removal into the fixed quantity of removal, so that the quantity of each removal is close to or equal to the limited quantity of removal: The component moving along with the contents is improved, to improve the sensitivity thereof regarding movement with the contents. The gas tightness of the main body portion, the moving component, and the outlet of the gas channel is improved. The opening of the gas channel is designed to be an elongated opening perpendicular to the movement track thereof.

The present invention further relates to a method for limiting the quantity of contents removed from a container. The method includes the following steps:

A: according to a volume of contents required to be removed, determining a distance, by which a gas outlet in communication with a gas for pressurizing is required to move, from start of movement to being in communication with an ambient gas;

B: using the gas to increase a pressure in a container holding the contents, and pushing the contents to move towards an outlet channel;

C: the contents in movement driving a moving component in the outlet channel of the container to move along;

D: the gas outlet in communication with the gas for pressurizing moving along with the moving component; and E: when the gas outlet moves to be in communication with the gas outside the container, the pressure in the container decreasing, and the contents stopping moving outwards, so that the removal process of the contents ends.

The gas outlet refers to an end, which is capable of being in communication with the ambient gas, of the gas channel in communication with the gas in the container anytime. The method is simple and practical, and may achieve removal of a limited quantity of or a fixed quantity of the contents in the container without the help of other devices, thereby not incurring excessive removal, pollution, or waste.

In the method for limiting the quantity of contents removed from a container, the gas for increasing the pressure in the container holding the contents may be collected in an inflatable bag inside the container. The other opening, in the container, of the gas channel in communication with the gas outlet may be arranged in the inflatable bag, so as to prevent a gas added during pressurizing from contacting the liquid. An inflatable device sleeves the opening, in the gas space of the main body portion, of the pressurizing device, and the gas added during pressurizing is all collected in the inflatable device. In this case, if the gas space in the upper part of the main body portion is filled with an inert gas, during a whole removal process of the liquid of the container, the liquid does not contact the ambient gas, and only the inert gas contacts the liquid, which facilitates better protection of the liquid. The second end outlet is arranged on the inflatable device to prevent the inert gas from escaping, so that only the pressurizing gas escapes when in communication with the ambient gas after each pressurizing.

In the method for limiting the quantity of contents removed from a container, when the gas is used to increase the pressure in the container holding the contents, the pressurizing gas meanwhile pressurizes a gas pocket that is mounted above an outlet of the outlet channel and used for blocking dust, and the pressurized gas pocket is straightened, so that the outlet of the outlet channel is unblocked. Therefore, the dust is prevented from contaminating the outlet, and operational steps such as opening and closing are avoided.

In the method for limiting the quantity of contents removed from a container, a method for determining the distance by which the gas outlet in communication with the pressurizing gas is required to move may be: selecting an outlet to be in communication with the ambient gas by closing the other portions, except a designated portion, of a strip-shaped opening on a movement track of the gas outlet or by closing the other outlets, except a designated outlet, of openings arranged in turn in a row. Therefore, a volume for removal may be arbitrarily selected within several preset ranges for selection.

In the method for limiting the quantity of contents removed from a container, a method for determining the distance by which the gas outlet in communication with the pressurizing gas is required to move may be: selecting a nearest outlet, to be in communication with the ambient gas, of the gas outlet by inserting or pulling a thin sheet covering a strip-shaped gas outlet or a row of gas outlets arranged in turn. Therefore, a volume for removal may be arbitrarily selected within a certain range for selection.

In the method for limiting the quantity of contents removed from a container, the moving component may be located in the outlet channel of the container. The moving component is located in the outlet channel, so that the moving component is more sensitive to movement with the contents.

In the method for limiting the quantity of contents removed from a container, after the gas outlet moves to be in communication with the gas outside the container, an elastic component may be used to drag the moving component to retract to the position before the movement, so as to ensure that the position of the moving component before movement is fixed, thereby ensuring a repeated limited quantity of or a repeated fixed quantity of removal of the contents in the container.

In the method for limiting the quantity of contents removed from a container, the gas outlet and the moving component may be integrally arranged. The gas outlet and the moving component are integrally arranged, so that the number of components of the container is reduced, the container is more durable, and the removing method is more reliable.

In the method for limiting the quantity of contents removed from a container, a gasbag having a gas inlet at one end and a gas outlet at the other end may be used to increase the pressure in the container holing the contents. The gasbag facilitates continuous pressurizing, and when the volume of the contents in the container is small and the volume of the gas is large, the limited quantity of or the fixed quantity of removal of the contents can still be achieved.

The method and the container according to the present invention can realize the limited quantity of or the fixed quantity of removal, and the quantity of contents of each removal does not exceed or is even equal to the set quantity, which facilitates improvement of the scientific living standard of people.

BRIEF DESCRIPTION OF THE DRAWINGS

The present invention is further illustrated below in detail with reference to the accompanying drawings and specific embodiments.

DETAILED DESCRIPTION OF THE PREFERRED EMBODIMENTS

Embodiment 1

Figure 1:
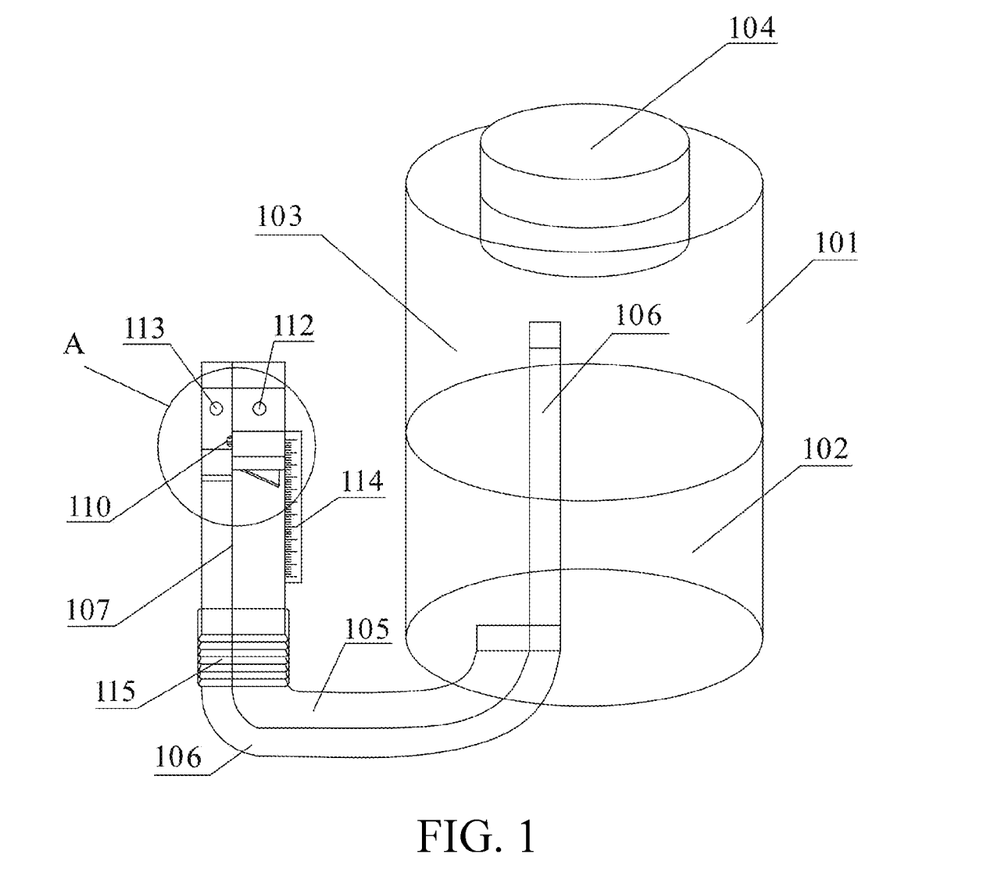
FIG. 1 is a front view of a container according to Embodiment 1.
Figure 2:
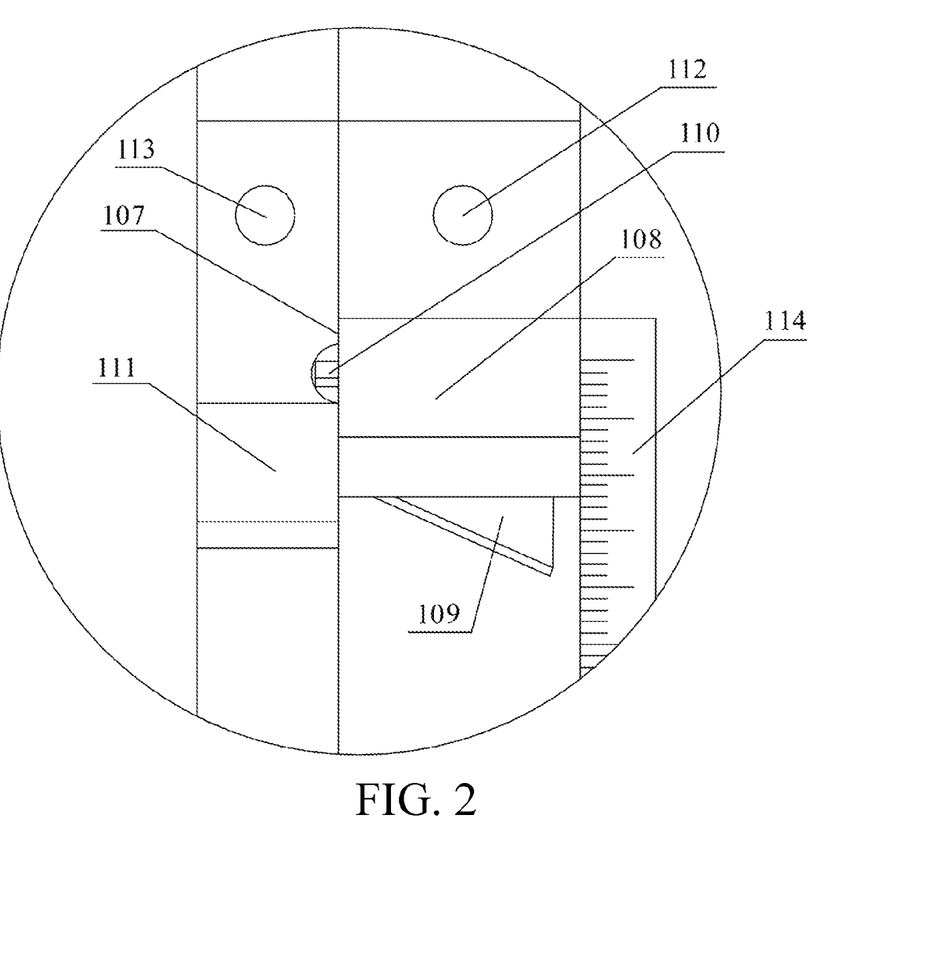
FIG. 2 is an enlarged view of a part A in FIG. 1.

FIG. 1 shows a container capable of limiting the quantity of contents removed therefrom according to Embodiment 1 of the present invention, and FIG. 2 is an enlarged view of a part A in FIG. 1. The container includes a container main body portion 101 and a pressurizing device 104. The main body portion is made of glass or other transparent materials, has a lower part filled with a liquid 102, and has an upper part having a gas cavity 103. The pressurizing device 104 is mounted on the container main body portion 101, that is, in an upper part of the gas cavity 103, and can pressurize the gas cavity 103 externally. In addition, the container capable of limiting the quantity of contents removed therefrom according to the present invention further includes a liquid outflow channel 105 and a gas channel 106 that are arranged adjacent to each other. An opening, in the container main body portion 101, of the liquid outflow channel 105 is located at the bottom of the liquid 102 (that is, the bottom of the container main body portion 101. The opening may also be integrally formed with the main body portion 101). An opening, in the main body portion 101, of the gas channel 106 is located in the gas cavity 103. Outside the main body portion 101, a wall 107 of the liquid outflow channel 105 and the gas channel 106 is made of a soft material. A moving device 108 capable of moving together with the liquid vertically is arranged in the liquid outflow channel 105. The moving device 108 has a one-way valve 109 matching a cross section of the liquid outflow channel 105. The valve 109 is closed when the pressurizing device performs pressurizing, and is automatically opened downwards when the pressure does not exist or is small. The moving device 108 has a protrusion 110 protruding outwards and adjacent to the wall 107, so that the wall 107 shared by the liquid outflow channel 105 and the gas channel 106 protrudes towards the gas channel 106. A position, in the gas channel 106, of the protrusion 110 is located above an upper end seal 111 of the gas channel 106, so that the upper end seal 111 can only move along with the moving device 108, so as to prevent the upper end seal 111 from moving upwards beyond the moving device 108. An opening 113 on a side surface of the gas channel 106 is lower than an outlet 112 of the liquid outflow channel 105, and a height difference is about the thickness of the protrusion 110 in a vertical direction shown in FIG. 1. An outer wall of the liquid outflow channel 105 is provided with a staff gauge 114 capable of being moved vertically manually and having a scale thereon.

A lower part of the liquid outflow channel 105 and the gas channel 106 is provided with a support component 115 capable of being compressed and stretched. An inner diameter of the portion of the liquid outflow channel 105 is smaller than an outer diameter of the moving device 108, so that the moving device 108 is always above the support component 115 and slides inside the liquid outflow channel 105. The support component 115 surrounds the periphery of the liquid outflow channel 105 and the gas channel 106, is made of an elastic material, and can be stretched or compressed. By compressing or stretching the support component 115, a height position of the moving device 108 can be changed. When in use, a zero-scale at an upper end of the staff gauge 114 is adjusted to be flush with a liquid level inside the main body portion 101, and according to a desired volume, the support component 115 is compressed or stretched to make an upper end of the moving device 108 be flush with a scale, corresponding to the selected volume, on the staff gauge 114 (called the selected scale in the following). Then, the pressurizing device 104 is used to perform pressurizing, so that the contained liquid 102 flows out through the liquid channel 105. At the moment, the one-way valve 109 on the moving device 108 is closed, and the moving device 108 moves along with the liquid. When the moving device 108 moves to the outlet 112 of the liquid outflow channel 105, at the moment the upper end of the moving device 108 reaches the zero-scale of the staff gauge 114, the upper end seal 111 of the gas channel 106 moves accordingly to be above the opening 113 of the side surface of the gas channel, the gas channel 106 is in communication with the ambience, a gas pressure in the main body portion 101 decreases, the liquid in the liquid outflow channel 105 flows back, and the measured removal of this time ends, so that the volume of the measured removal does not exceed the set volume. Upon completion of each measured removal, the moving device 108 descends and arrives on the support component 115.

If the quantity of each measured removal is the same and the volume is small, during next use, the moving device 108 in the liquid outflow channel 105 may not be moved, and only pressurizing is required to be performed on the pressurizing device 104 to complete the process of measured removal.

Embodiment 2

Figure 3:
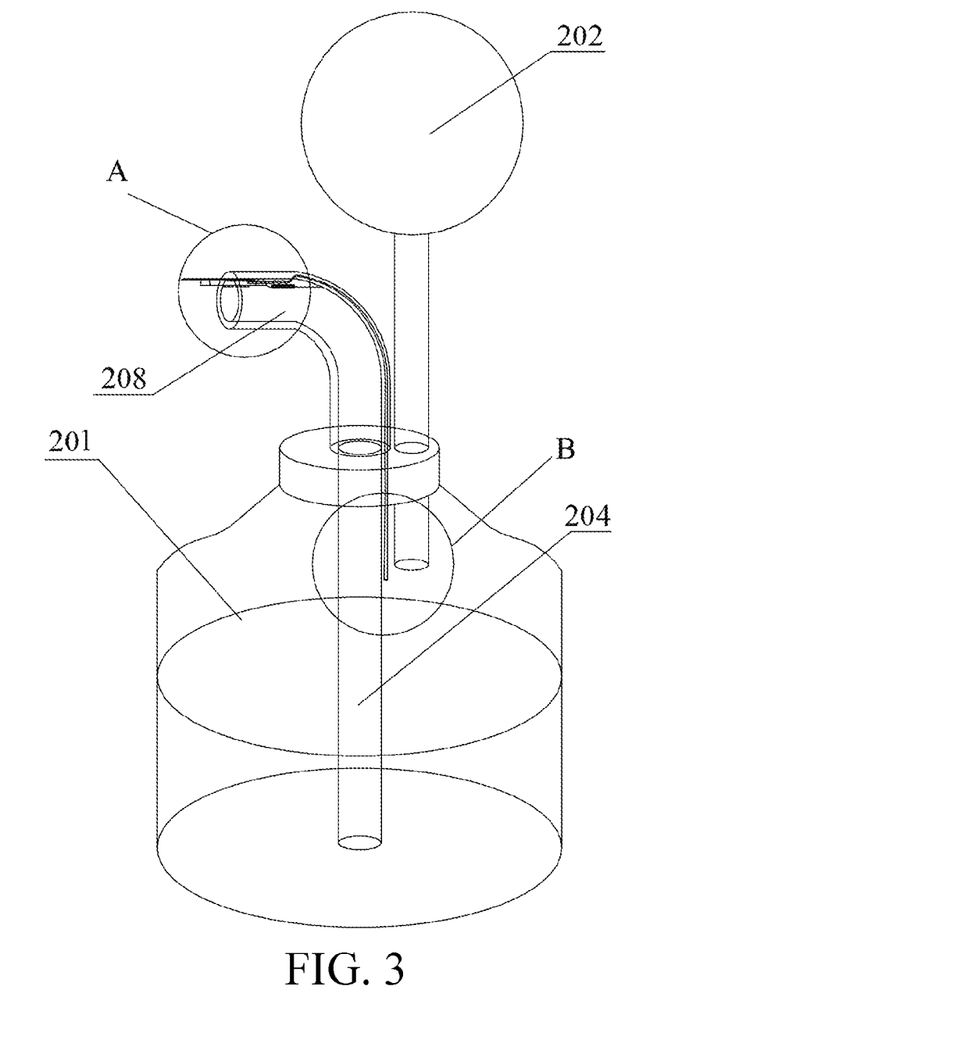
FIG. 3 is a front view of a container according to Embodiment 2.
Figure 4:
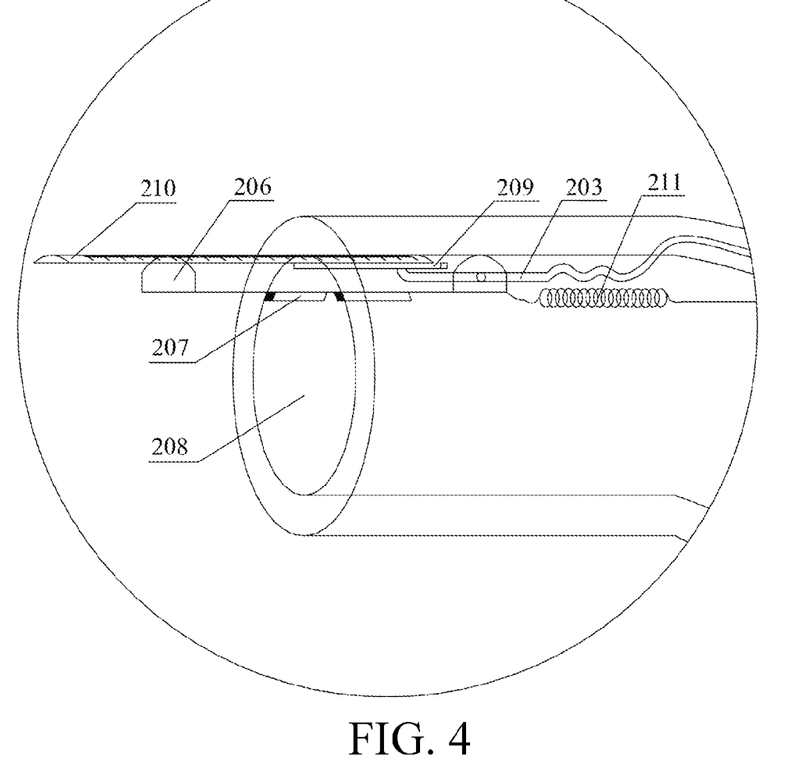
FIG. 4 is an enlarged view of a part A in FIG. 3.
Figure 5:
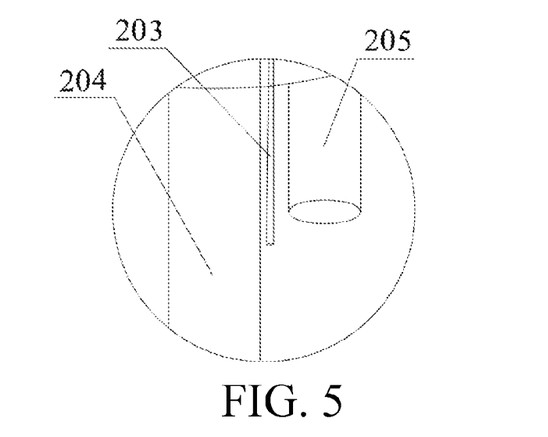
FIG. 5 is an enlarged view of a part B in FIG. 3.

FIG. 3 shows a container capable of limiting the quantity of contents removed therefrom according to Embodiment 2, and FIG. 4 and FIG. 5 are enlarged views of a part A and a part B in FIG. 3. The container is a container for holding a viscous liquid or paste, and includes a container main body portion 201 and a gasbag 202 (equivalent to the pressurizing device 104 in Embodiment 1) capable of pressurizing the container. By squeezing the gasbag 202, an opening 205 thereof located in the main body portion 201 pressurizes the main body portion 201. A gas space in an upper part of the main body portion 201 has a gas channel 203 extending to the middle of the outflow channel 208. A tail of the outflow channel 208 has a suction tube 204 extending almost to the bottom of the main body portion 201. A lower part of the suction tube 204 is provided with a one-way valve (not shown), to prevent the liquid or paste from flowing back. An inner side wall of the outflow channel 208 has a slide block 206. The slide block 206 may slide on a slide way 207 arranged on the inner side wall of the outflow channel 208. The slide way 207 extends to an external opening, located outside the main body portion 201, of the outflow channel 208. A rear part of an upper side surface of the slide block 206 is provided with a strip-shaped opening 209. The strip-shaped opening 209 is in communication with a gas pipeline 203. None of the other surfaces of the slide block 206 has any opening. An opaque thin sheet 210 is provided between the slide block 206 and the inner side wall of the outflow channel 208. A small opening (not shown) is provided at a position, corresponding to the strip-shaped opening 209, on the thin sheet 210. By inserting or pulling the thin sheet 210, a distance between an opening of a gas channel and the external opening of the outflow channel 208 is adjusted. Gas sealing is achieved between the thin sheet 210 and the slide block 206 and between the thin sheet 210 and the inner side wall of the outflow channel 208, and the thin sheet 210 may move together with the slide block 206. The thin sheet 210 is provided with a scale to indicate the distance between the opening and the external opening of the outflow channel 208 or a volume of the contents (the paste or the liquid) corresponding to the distance.

When in use, the gasbag 202 is used to pressurize the main body portion 201, and the pressure pushes the paste to be squeezed out through the suction tube 204 and the outflow channel 208, and also pushes the slide block 206 to slide outwards synchronously. When the slide block 206 slides to the opening on the thin sheet 210 and is exposed, the gas channel 203 is in communication with the ambience, and the gas pressure in the main body portion 201 decreases, so that no pressure for outward pushing exists, and the paste is not squeezed out anymore. An inner diameter of the outflow channel 208 is fixed, so that by adjusting the opening of the thin sheet 210 on the slide block 206, the determined volume of the paste squeezed out each time is obtained. At least, the volume for squeeze-out each time does not exceed the set quantity.

A return spring 211 is mounted on the slide block 206. Upon completion of a squeezing motion, the slide block 206 returns to the inside of the outflow channel 208 under the action of the return spring 211.

Embodiment 3

Figure 6:
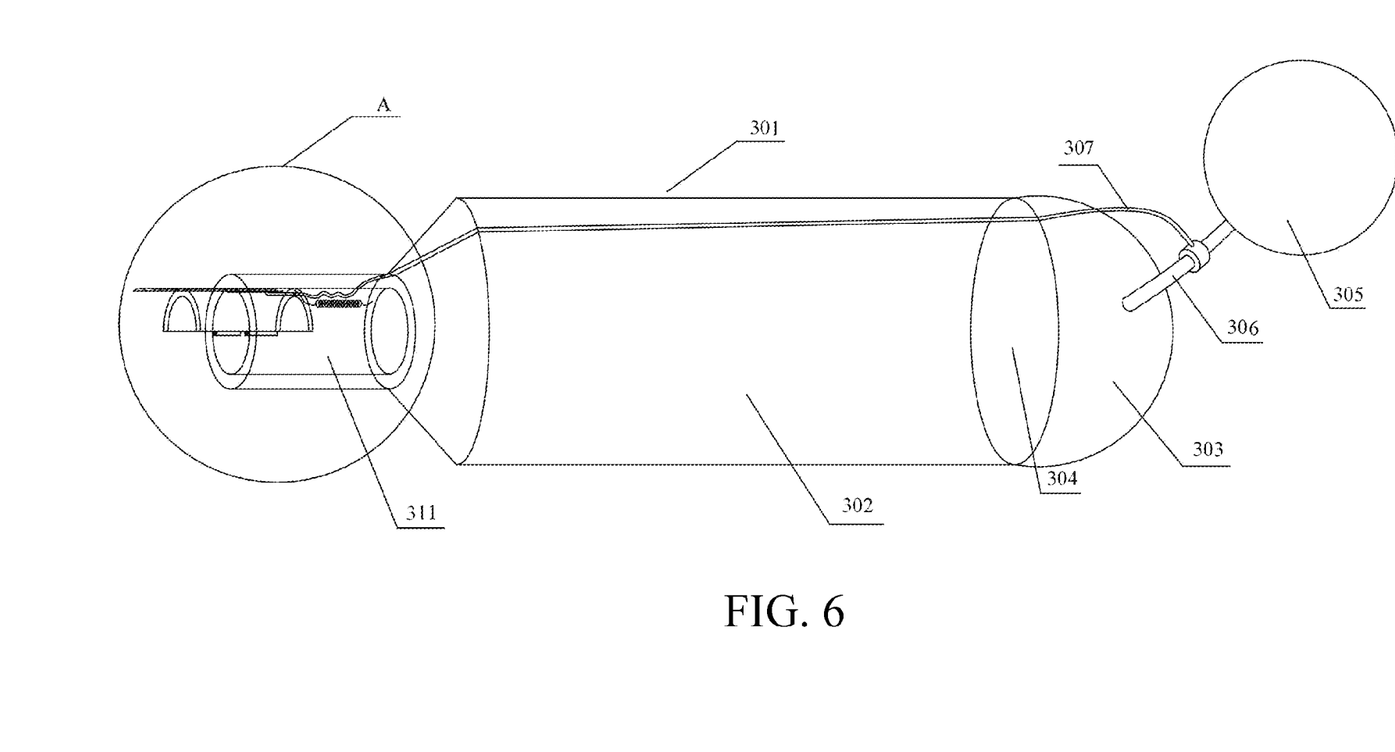
FIG. 6 is a front view of a container according to Embodiment 3.
Figure 7:
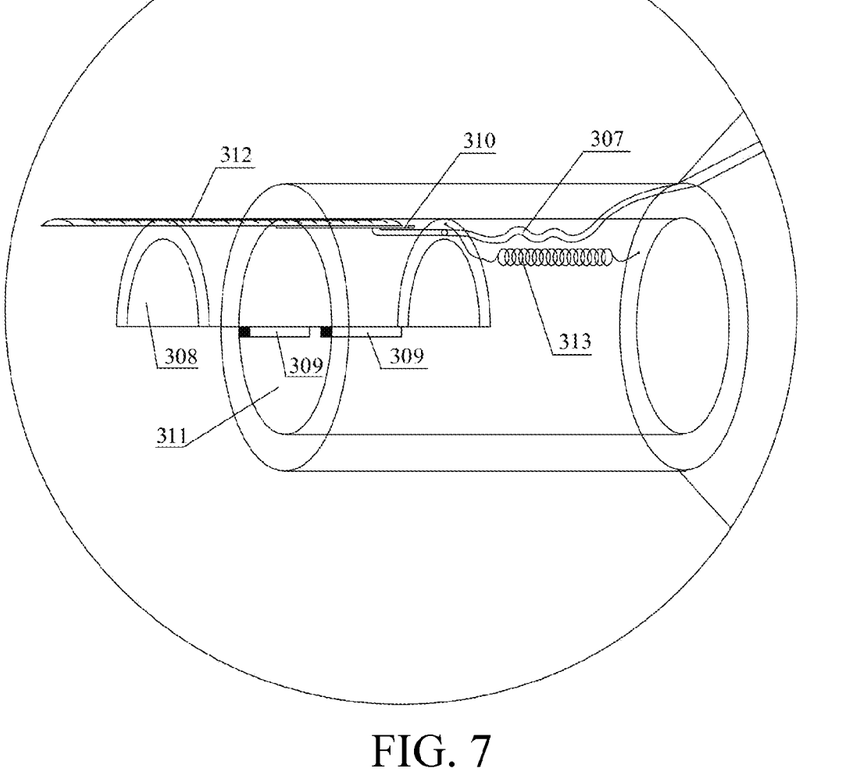
FIG. 7 is an enlarged view of a part A in FIG. 6.

FIG. 6 shows a container capable of limiting the quantity of contents removed therefrom according to Embodiment 3, and FIG. 7 is an enlarged view of a part A in FIG. 6. The container is a container with aluminum skin and for holding paste, and includes a container main body portion 301 and a pressurizing gasbag 305. The main body portion is tubular, has a front part 302 for holding paste-like substance, such as toothpaste, and has a rear part 303 having a small section of space filled with a gas. The front part 302 is connected to an outflow channel 311. The rear part 303 is connected to the pressurizing gasbag 305. A component 304 having a same inner diameter as the front part 302 is arranged between the front part 302 and the rear part 303, so as to squeeze toothpaste forwards. The gasbag 305 is connected to a three-way gas pipe. The three-way gas pipe includes a thick branch gas channel 306 and a thin branch gas channel 307. The thick branch gas channel 306 extends to a gas space in the rear part 303. The thin branch gas channel 307 extends to a tail of a semi-circular slide block 308 in the outflow channel 311, and is in communication with an opening 310.

The slide block 308 is located on an inner upper side wall of the outflow channel 311. The slide block 308 may slide on a slide way 309 arranged on an inner side wall of the outflow channel 311. A rear part of the slide block 308 is in communication with the thin branch gas channel 307, and a surface opposite to the inner side wall of the outflow channel 311 is provided with a longitudinal strip-shaped opening 310. An insertion sheet 312 capable of being inserted into or pulled out of the outflow channel 311 covers the opening 310. A lateral opening (not shown) is provided at a position, corresponding to the longitudinal strip-shaped opening 310, on the insertion sheet 312. Gas tightness is achieved between the insertion sheet 312 and the slide block 308 and between the insertion sheet 312 and the inner wall of the outflow channel 311. By inserting or pulling the insertion sheet 312, a distance between the lateral opening and an outer port of the outflow channel 311 may be adjusted, so as to determine the length or volume of measured removal of the paste. A pin (not shown) is arranged between the insertion sheet 312 and the slide block 308, and is fastened when a relative position relationship between the two is determined, so that the two move together. When the volume of measured removal is fixed, the insertion sheet may not be arranged as long as an opening incapable of being adjusted is arranged in a fixed position of a surface, in close contact with the inner wall, of the slide block 308.

When in use, the gasbag 305 is squeezed. The lateral opening does not overlap with the outer port of the outflow channel 311 and extends to the outflow channel 311, so that an opening of the thin branch gas channel 307 is sealed. A gas pressurizes the space in the rear part of the main body portion 301 through the thick branch gas channel 306, to push the component 304 to move forwards, so that the paste is squeezed out through the outlet of the outflow channel 311, and the slide block 308 is driven to move together. When the slide block 308 moves to a position that makes the opening exposed, the gas channel 307 is in communication with the ambience, the pressure of the gas space in the rear part 303 of the main body portion 301 decreases, and the paste is not squeezed out anymore.

After much paste is squeezed out, the gas space in the rear part 303 of the main body portion 301 increases, so that increase of the pressure slows down during pressurizing. At the moment, the rear part 303 of the main body portion 301 may be squeezed, so as to reduce the gas space, thereby facilitating rapid increase of the pressure.

An elastic component 313 is mounted on the tail of the slide block 308. Upon completion of a squeezing motion, the slide block 308 returns to the inside of the outflow channel 311 under the action of the elastic component 313.

Embodiment 4

Figure 8:
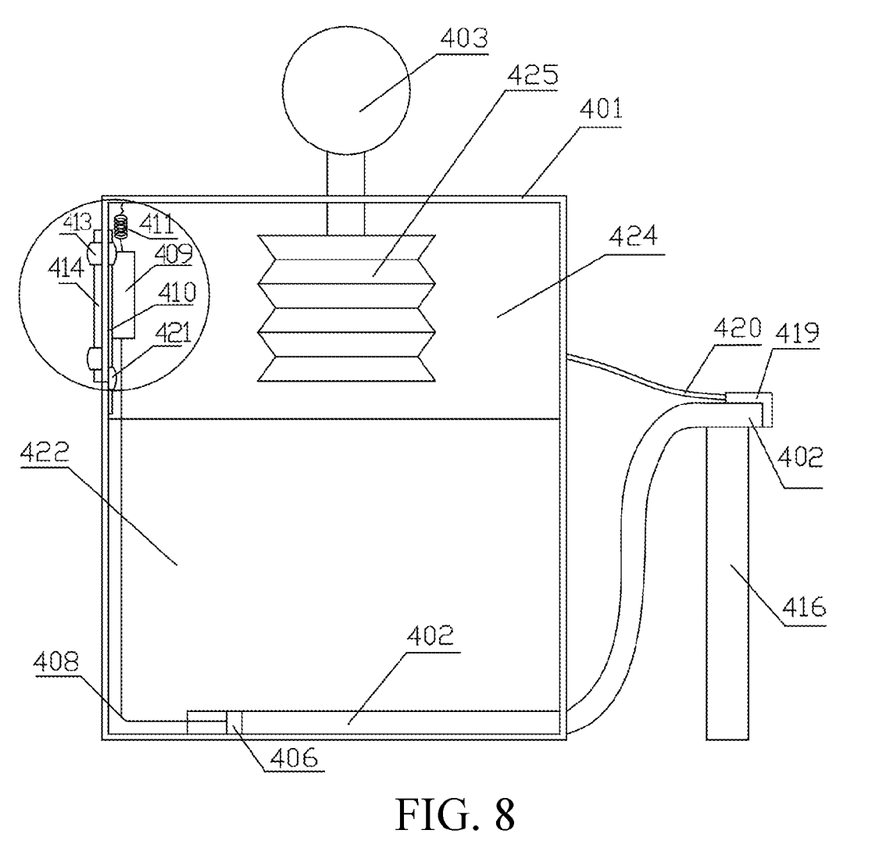
FIG. 8 is a front view of a container according to Embodiment 4.
Figure 9:
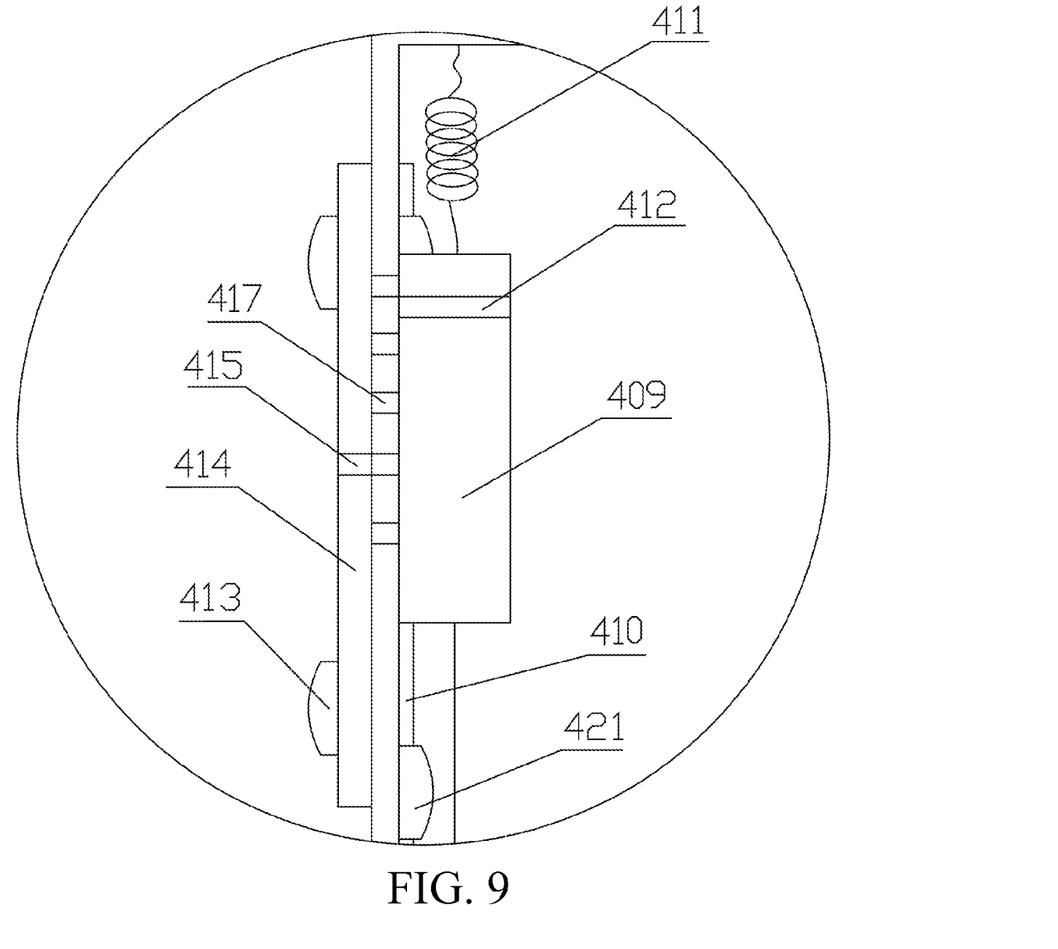
FIG. 9 is an enlarged view of a part A in FIG. 8.
Figure 10:
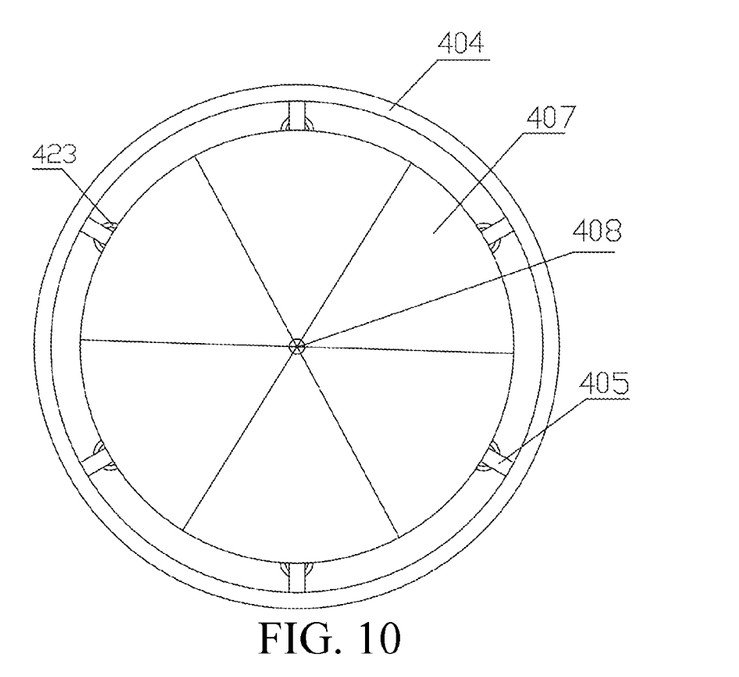
FIG. 10 is a front view of a piston 406 during repositioning of a slide sheet 409 according to Embodiment 4.
Figure 11:
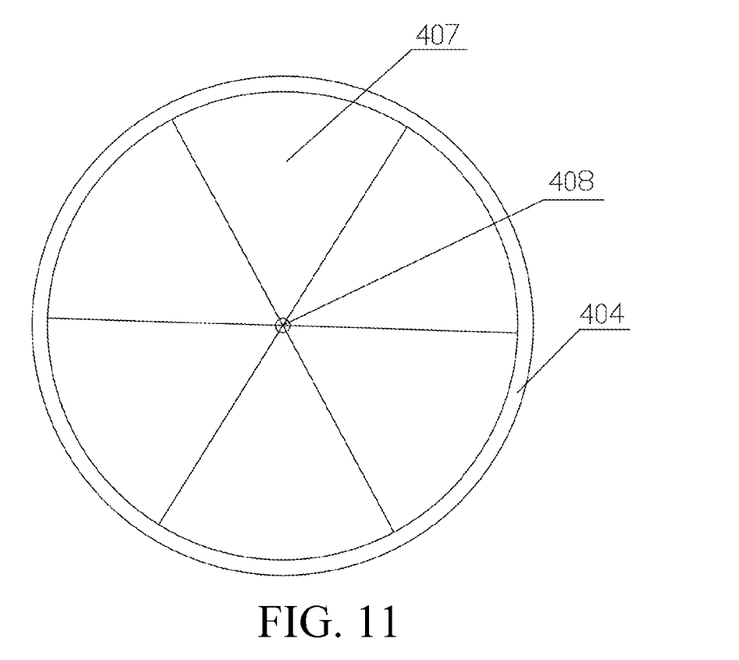
FIG. 11 is a front view of a piston 406 during pressuring according to Embodiment 4.

FIG. 8 shows a container capable of limiting the quantity of contents removed therefrom according to Embodiment 4, FIG. 9 is an enlarged view of a part A in FIG. 8, and FIG. 10 and FIG. 11 are state diagrams of a piston 406. The container includes a main body portion 401, a pressurizing gasbag 403, and an outflow channel 402. The main body portion is made of hard plastic, has an upper part provided with an opening, and when filled with a liquid, is provided with the mounted gasbag 403 for increasing a pressure of a gas inside the main body portion 401. The upper part is a gas space 424, and a lower part is a liquid space 422. A portion, inside the main body portion 401, of the outflow channel 402 is located at the bottom of the main body portion 401, and is in a horizontal direction. A moving component in the outflow channel 402 is a piston 406 formed of a rim 404 and spokes 405. An upstream surface of the piston 406 (a surface through which the contents apply a pressure to the piston) is covered with annularly arranged thin sheets 407. One end, facing the center, of each thin sheet is connected to one end of a filament 408, and the other end is movably connected to the spoke 405 on the piston 406 by a slide ring 423. The slide ring 423 may slide radially on the spoke 405 by a distance being about 1/5 of length of the spoke. The other end of the filament 408 is connected to a strip-shaped slide sheet 409. The strip-shaped slide sheet 409 is located on a slide way 410 on an inner wall of the gas space in the upper part of the main body portion 401, and may slide vertically thereon. The slide way 410 is fixed on the inner wall by a thickened fixing device 421. Gas sealing is achieved between the strip-shaped slide sheet 409 and the inner wall of the main body portion. A tail of the slide sheet 409 is fixedly connected to the inner wall by an elastic component 411. A through opening 412 is provided at a middle position of a rear part of the slide sheet 409. Several openings 417, near which a scale is marked, are provided in turn at positions, corresponding to the opening 412 and along the direction of the slide way 410, of the main body portion 401. An outer wall, along the direction of the slide way 410, of the main body portion 401 is provided with a thickened portion 413, which is used for making a strip-shaped clamping sheet 414 pressed against the outer wall of the main body portion 401, and keeping gas tightness. A lateral elongated opening 415 is provided at a position, corresponding to the opening 417 of the main body portion, in the middle of the strip-shaped clamping sheet 414. The strip-shaped clamping sheet 414 may move vertically along the direction of the slide way 410. The outflow channel 402 outside the main body portion 401 is a flexible pipeline. A support frame 416 supports the pipeline. When a liquid level in the main body portion 401 lowers, the height of the support frame 416 is adjusted, so that a lower edge of an inner diameter of the pipeline is always flush with the liquid level in the main body portion 401.

When in use, according to the volume of removal, the strip-shaped clamping sheet 414 is moved, so that the opening 415 of the clamping sheet 414 coincides with the opening 417 near the corresponding scale on the wall of the main body portion 401. The gasbag 403 is pressed to perform pressurizing, the thin sheets 407 are squeezed onto the piston 406, the piston 406 is pushed to move outwards along the outflow channel 402, and the filament 408 drives the slide sheet 409 to move along the rail 410. When the opening 412 on the slide sheet moves to the selected opening on the wall of the main body portion, the gas channel is in communication with the ambience, the gas pressure in the main body portion 401 decreases, and the piston 406 does not move forwards anymore. At the moment, the volume of the liquid that flows out is the volume of the liquid pushed by the piston 406, and is the volume indicated by the scale. Then, under the action of the elastic component 411 at the tail of the slide sheet 409, the slide sheet 409 is repositioned, and drives the piston 406 to move backwards. The thin sheets 407 are raised, and the liquid fills up the space before the piston 406, so that preparation is done for a next time of use.

In order to prevent the external opening portion of the outflow channel 402 from being contaminated by external dust, a gas pocket 419 may be mounted horizontally above the opening. The gas pocket 419 has a pipeline 420 in communication with the gas space 424 of the main body portion. During pressurizing, the gas pocket 419 inflates, and is straightened horizontally, so that the opening of the outflow channel 402 opens. After the pressure decreases, the gas pocket 419 sags under the action of gravity to block the opening, so that the dust is kept outside the opening.

An inflatable film bag 425 may sleeve the opening, in the gas space 424 of the main body portion 401, of the pressurizing gasbag 403. A gas added during pressurizing is all collected in the inflatable film bag, so as to prevent pollution or chemical reaction incurred by contact of the gas added during pressurizing and the liquid space 422. In this case, if the gas space 424 in the upper part of the main body portion 401 is filled with an inert gas, during a whole removal process of the liquid of the container, the liquid does not contact the ambient gas, and only the inert gas contacts the liquid, which facilitates better protection of the liquid.

The film bag 425 is not shrinkable, and therefore a part of the gas input into the film bag during each pressurizing remains in the film bag after the pressure decreases, so that during next removal of the contents, the pressure can rise rapidly, thereby avoiding repeated pressurizing during the next time of use.

In another variation of this embodiment, the strip-shaped clamping sheet 414 is not used, but several independent clamping sheets capable of being inserted and pulled are arranged near the several openings 417 on the outer wall of the main body portion 401 respectively, so as to independently control opening or closing of the openings 417 respectively. During measured removal, it is only required to open the opening corresponding to the volume by pulling, insert the clamping sheets into the other openings, and perform pressurizing, so that the required volume of liquid flows out through the opening.

Although the embodiments of the present invention are illustrated and described, it should be understood by persons of ordinary skills in the art that multiple changes, modifications, replacements, variations and combinations may be made to the embodiments without departing from the principle and spirit of the present invention. The scope of the present invention is defined by the appended claims and equivalents thereof.

What is claimed is:

1. A method for limiting the quantity of contents removed from a container, comprising:
    A: according to a volume of contents required to be removed, determining a distance, by which a gas outlet in communication with a gas for pressurizing is required to move, from start of movement to being in communication with an ambient gas;
    B: using the gas to increase a pressure in a container holding the contents, and pushing the contents to move towards an outlet channel of the container;
    C: the contents in movement driving a moving component in the outlet channel of the container to move along;
    D: the gas outlet in communication with the gas for pressurizing moving along with the moving component; and
    E: when the gas outlet moves to be in communication with the gas outside the container, the pressure in the container decreasing, and the contents stopping moving outwards, so that the removal process of the contents ends.

2. The method for limiting the quantity of contents removed from a container according to claim 1, wherein:
    the gas for increasing the pressure in the container holding the contents is collected in an inflatable bag in the container.

3. The method for limiting the quantity of contents removed from a container according to claim 2, wherein:
    the other opening, in the container, of a gas channel in communication with the gas outlet is in the inflatable bag.

4. The method for limiting the quantity of contents removed from a container according to claim 1, wherein:
    when the gas is used to increase the pressure in the container holding the contents, the pressurizing gas meanwhile pressurizes a gas pocket that is mounted above an outlet of the outlet channel and used for blocking dust, and the pressurized gas pocket is straightened, so that the outlet of the outlet channel is unblocked.

5. The method for limiting the quantity of contents removed from a container according to claim 1, wherein:

a method for determining the distance by which the gas outlet in communication with the pressurizing gas is required to move is: selecting an outlet to be in communication with the ambient gas by closing the other portions, except a designated portion, of a strip-shaped opening on a movement track of the gas outlet or by closing the other outlets, except a designated outlet, of openings arranged in turn in a row.

6. The method for limiting the quantity of contents removed from a container according to claim 1, wherein:
a method for determining the distance by which the gas outlet in communication with the pressurizing gas is required to move is: selecting a nearest outlet, to be in communication with the ambient gas, of the gas outlet by inserting or pulling a thin sheet covering a strip-shaped gas outlet or a row of gas outlets arranged in turn.

7. The method for limiting the quantity of contents removed from a container according to claim 1, wherein:
after the gas outlet moves to be in communication with the gas outside the container, an elastic component is used to drag the moving component to retract to the position before the movement.

8. The method for limiting the quantity of contents removed from a container according to claim 1, wherein:
the gas outlet and the moving component are integrally arranged.

9. The method for limiting the quantity of contents removed from a container according to claim 1, wherein:
a gasbag having a gas inlet at one end and a gas outlet at the other end is used to increase the pressure in the container holing the contents.

10. A container capable of limiting the quantity of contents removed therefrom, comprising a main body portion, a pressurizing portion, and an outflow channel, the main body portion comprising a gas space and a space for holding the contents, the pressurizing portion being a device for increasing a pressure of a gas in the gas space, and the outflow channel being a channel that is in communication with the space for holding the contents and allows outflow of the contents, wherein:
the container further comprises a moving component arranged in the outflow channel, the moving component comprises a piston, and the piston comprises a rim, spokes, and thin sheets covering an upstream surface of the piston;
the container further comprises a slide sheet arranged in the gas space, the slide sheet is connected to the piston, and a through opening is provided at a middle position in a rear part of the slide sheet;
multiple openings are provided in turn at positions, corresponding to the through opening, on the main body portion; and
the container further comprises a movable clamping sheet arranged on an outer side of the main body portion, and the clamping sheet is provided with a lateral elongated opening corresponding to the opening of the main body portion.

11. The container capable of limiting the quantity of contents removed therefrom according to claim 10, wherein:
the container further comprises a support frame, the outflow channel outside the main body portion is a flexible pipeline, the support frame supports the pipeline, and when a liquid level in the main body portion lowers, the height of the support frame is adjusted so that a lower edge of an inner diameter of the pipeline is flush with the liquid level in the main body portion.

12. The container capable of limiting the quantity of contents removed therefrom according to claim 10, wherein:
an inflatable device sleeves an opening, in the gas space of the main body portion, of the pressurizing portion.

13. The container capable of limiting the quantity of contents removed therefrom according to claim 12, wherein:
the device is not shrinkable.
the moving component is provided with a device for restricting the contents from flowing to one side, close to the main body portion, of the moving component.

14. The container capable of limiting the quantity of contents removed therefrom according to claim 10, wherein:
a gas pocket for blocking dust is mounted above the outlet of the outflow channel, and the gas pocket is in communication with the gas space through the gas channel.

* * * * *